United States Patent

[11] 3,589,471

| [72] | Inventor | Robert G. Edge |
| | | Allestree, Derby, England |
| [21] | Appl. No. | 805,147 |
| [22] | Filed | Mar. 7, 1969 |
| [45] | Patented | June 29, 1971 |
| [73] | Assignee | Rolls-Royce Limited |
| | | Derby, England |
| [32] | Priority | Mar. 29, 1968 |
| [33] | | Great Britain |
| [31] | | 15286/68 |

[54] SPLINE LUBRICATION FROM RESERVOIR
6 Claims, 3 Drawing Figs.

[52] U.S. Cl. .................................................. 184/6,
60/39.08, 308/187
[51] Int. Cl. ............................................... F16n 7/36,
F02c 7/06
[50] Field of Search ........................................... 308/187;
60/39.08; 184/6, 6 TS

[56] References Cited
UNITED STATES PATENTS
2,770,946  11/1956  Savin, Jr. .................... 60/39.08 X

| 2,870,870 | 1/1959 | Haworth et al. ............... | 60/39.08 X |
| 3,266,596 | 8/1966 | Blackhurst et al. ............ | 60/39.08 X |
| 3,325,088 | 6/1967 | Keen et al. .................... | 308/187 X |

FOREIGN PATENTS 876,862  9/1961  Great Britain ................  184/6 TS

*Primary Examiner*—Manuel A. Antonakas
*Attorney*—Cushman, Darby and Cushman

ABSTRACT: A lubricated drive system for an accessory of a gas turbine engine which includes means for intermittently lubricating a splined interconnection between two shafts as well as means for lubricating a bearing for the shafts. Lubricant is supplied to an annular reservoir within one shaft, and this reservoir is kept full by centrifugal force when the shaft is rotating. During this period of rotation at a predetermined minimum speed, the excess lubricant supplied to the reservoir is discharged therefrom onto the bearing for the shaft or shafts, and when rotation of the shaft reduces below the minimum value or stops, the predetermined amount of lubricant within the annular reservoir spills therefrom onto a splined interconnection between the shafts so that it can centrifuge into the splines when rotation of the shafts begins.

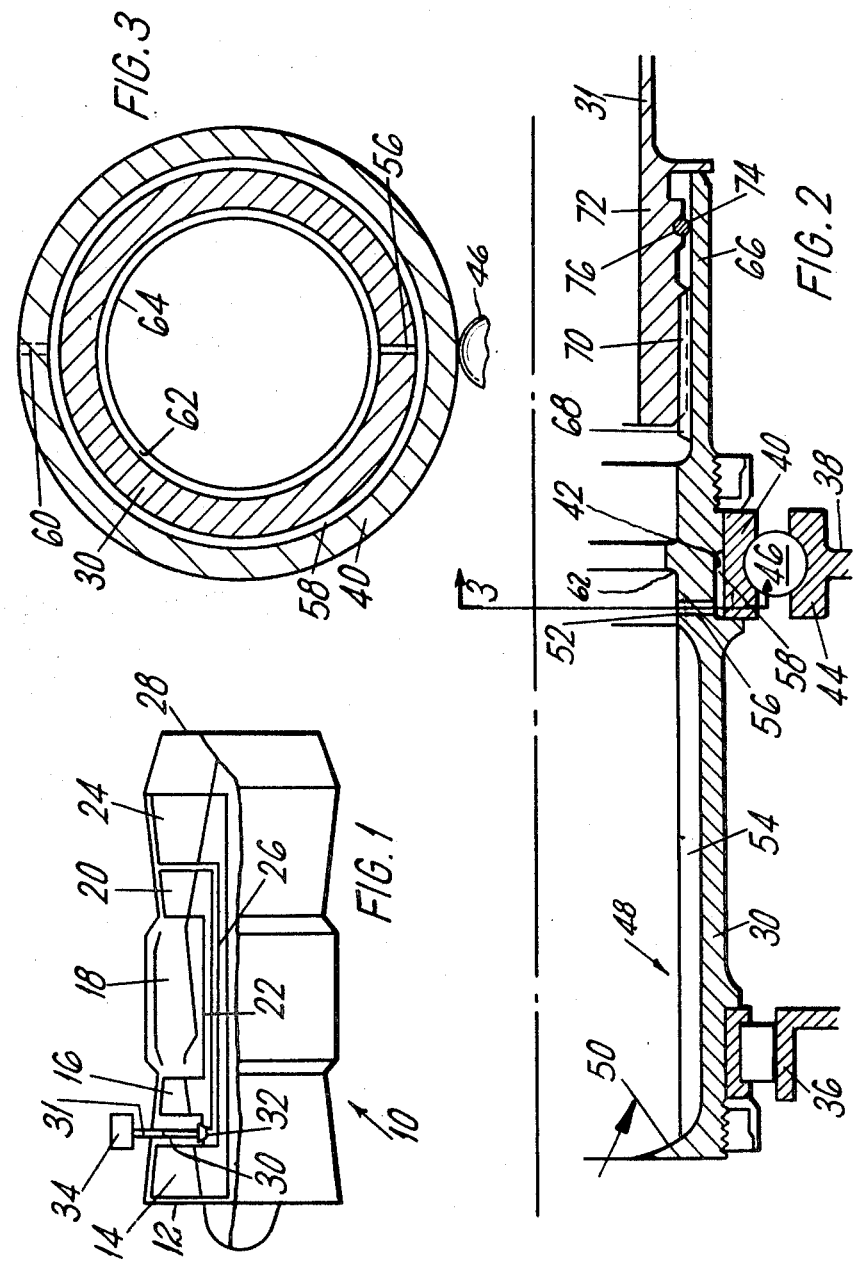

SPLINE LUBRICATION FROM RESERVOIR

The present invention relates to a lubricated drive system for an accessory of a gas turbine engine and, more particularly, to a lubricated drive system having its own lubricant reservoir from which lubricant flows when the drive shafts of the system rotate at a predetermined minimum speed, the lubricant being directed to a bearing means and the arrangement further having means whereby lubricant is spilled from the reservoir onto interengaging splines between two shafts of the system when the shafts rotate below the minimum speed or are stopped.

Prior drive systems for accessories such as hydraulic pumps and the like have been incorporated totally within the main lubrication system of the gas turbine engine. Where these accessory drive systems have splined interconnections, it has been found undesirable to include the lubrication of the same into the main lubrication system of the gas turbine engine for two reasons. First, the lubrication system of a gas turbine engine is of small capacity and circulates lubricant at an extremely rapid speed throughout the various parts to be lubricated and, thus, if the seals of the splined shafts of the accessory fail, the lubricant from the main system would be quickly depleted in less than a minute. Secondly, the accessory drive systems drive hydraulic pumps and the like, and should the pump fail, the main lubrication system for the gas turbine engine could become contaminated with another fluid causing improper lubrication of the rotating parts of the gas turbine engine.

The present invention obviates the above problems by providing an arrangement for a drive system of an accessory in which in effect the drive system is provided with its own reservoir which supplies lubricant to the bearings of the shafts of the system when the shafts are rotating at or above a minimum speed and then supplies lubricant to splines between the shafts only when the shafts are rotating below the minimum speed or are stopped. This is accomplished by providing an annular reservoir within a hollow takeoff drive shaft, the annular reservoir being continuously supplied with lubricant during rotation and retaining a predetermined quantity of lubricant when rotated at or above a predetermined value. Excess lubricant to the reservoir is fed at this time from the reservoir to the bearing means for the shafts, but when the shafts rotate at a speed below the predetermined minimum speed or are stopped, the predetermined quantity of liquid is caused to spill from the reservoir onto the splines so that the splines will be properly lubricated when the gas turbine engine is restarted.

Preferably the reservoir comprises a circumferentially extending recess in the internal surface of the hollow drive shaft, the recess being positioned between axially separated portions of the internal surface of different radius and the outlet means comprising at least one substantially radially extending duct communicating between one portion of the internal surface of the hollow drive shaft having the larger radius and the external surface of the same.

In a preferred embodiment of the invention, each duct is provided in a segment of the rotatable member not exceeding 180° of its circumference and communicates with an annular chamber provided on the external surface of the rotatable member, which chamber communicates with bearing means for the drive shaft by at least one further substantially radially extending duct, each further duct communicating with a segment of the annular chamber substantially diametrically opposed to the segment of the hollow drive shaft containing the first mentioned duct or ducts.

Preferably the portion of the internal surface of the hollow drive shaft having the larger radius is provided with a radially inwardly projecting annular weir member positioned on the side of the first mentioned duct or ducts remote from the reservoir and between the first mentioned duct or ducts and the first mentioned part, the radius of the radially inner surface of the weir member being greater than the radius of the portion of the internal surface of the rotatable member having the smaller radius.

One embodiment of the invention will now be particularly described, by way of nonlimitative example only, with reference to the accompanying drawings, in which:

FIG. 1 is a diagrammatic part-sectional top plan view of a gas turbine engine having an accessory drive arrangement incorporating a lubrication system in accordance with the invention;

FIG. 2 is an enlarged part-sectional view of the accessory drive arrangement shown in FIG. 1; and FIG. 3 is a section taken substantially on the line 3–3 of FIG. 2 but illustrating further the portion omitted from Fig. 2.

In Fig. 1 there is shown a gas turbine engine 10 comprising, in flow series, an air intake 12, a low pressure compressor 14, a high pressure compressor 16, combustion equipment 18, a high pressure turbine 20 drivingly connected to the high pressure compressor 16 by a shaft 22, a low pressure turbine 24 drivingly connected to the low pressure compressor 14 by a shaft 26 and a propulsion nozzle 28. A hollow accessory drive shaft 30, extending horizontally and at right angles to the axis of the shaft 22, is driven therefrom via bevel gears 32. The shaft 30 is, in turn, drivingly connected to a second shaft 31 of a hydraulic pump 34.

The hollow accessory drive shaft 30 is shown in more detail in Fig. 2, and can be seen to be rotatably mounted in axially spaced apart bearing 36, 38, the bearing 36 being a roller bearing and the bearing 38 being a ball bearing. The bearing 38 comprises an inner race 40 secured to the external surface 42 of the shaft 30, and outer race 44 secured to fixed structure (not shown) and a plurality of balls 46.

Provided in the internal surface 48 of the shaft 30, between portions 50, 52 thereof of different radius, is a circumferentially extending recess 54 which constitutes an annular lubricant reservoir. Means for continuously supplying lubricant (not shown) to the reservoir 54 is arranged to the left of the portion 50 of the internal surface 48 of the shaft 30, as viewed in Fig. 2.

A substantially radially extending duct 56 communicates between the portion 52 of the internal surface 48 of the shaft 30, which portion 52 is of greater radius than the portion 50, and an annular chamber 58 defined between the external surface 42 of the shaft 30 and the inner race 40 of the bearing 38. A further substantially radially extending duct 60, angularly spaced from the duct 56 by approximately 180°, communicates between the annular chamber 58 and the balls 46 of the bearing 38: this feature is shown more clearly in Fig. 3.

The portion 52 of the internal surface 48 of the shaft 30 is provided, on the side of duct 56 remote from the reservoir 54, with a radially inwardly projecting annular weir member 62 having a radially inner surface 64 whose radius is greater than the radius of the portion 50.

The end 66 of the shaft 30 on the side of the weir member 62 remote from the reservoir 54 is open and arranged to surround coaxially the end 72 of the shaft 31, and is provided with axially extending internal splines 68 which engage axially extending external splines 70 provided on the end 72 of the shaft 31. A sealing ring 74 of elastomeric material is located, on the side of the splines 68, 70 remote from the reservoir 54, in an annular groove 76 in the external surface of the shaft 31 and sealingly engages the internal surface 48 of the shaft 30.

In operation, when the gas turbine engine 10 is running normally lubricant is continuously supplied to the reservoir 54 and is retained therein by centrifugal force. When the reservoir 54 is full, lubricant spills over the edge of the reservoir 54 defined by the portion 52 of the internal surface 48 of the shaft 30 and flows continuously to the balls 46 of the bearing 38 via the duct 56, the annular chamber 58 and the duct 60: lubricant is prevented from passing to the splines 68, 70 by the weir member 62.

When the gas turbine engine 10 is shut down, the speed of rotation of the shaft 30 falls below the minimum value necessary to produce sufficient centrifugal force to retain the lubricant in the reservoir 54. The lubricant which formerly occupied the annular reservoir 54 thus falls to the bottom of the interior of the shaft 30 substantially increasing the depth of the lubricant at the bottom of the interior of the shaft 30. Lubricant therefore flows over the weir member 62 into the space occupied by the splines 68, 70 and is retained therein by the sealing ring 74. Very little lubricant flows to the bearing 38 due to the 180° angular spacing between the ducts 56, 60.

On restarting of the gas turbine engine 10, the lubricant which has spilled into the space occupied by the splines 68, 70 is spread into an annular layer on the internal surface 48 of the shaft 30 between the splines 68, 70 while further lubricant is supplied to the reservoir 54 and the bearing 38 as hereinbefore described. Since there is a possibility of a continuous slight leakage of lubricant past the sealing ring 74, it will be appreciated that the lubrication system of the present invention ensures that the space occupied by the splines 68, 70 is replenished with lubricant each time the gas turbine engine 10 is shut down. Additionally, the supply of a continuous flow of lubricant to the splines 68, 70 with the attendant possibility of rapidly losing all the lubricant in the gas turbine engine 10 should the sealing ring 74 fail, is avoided. Finally, the sealing ring 74 reduces the possibility of contamination of the lubricant by hydraulic fluid in the event of a failure of the hydraulic pump 34.

It will be appreciated that the "predetermined value" of the speed of rotation of the rotatable member referred to hereinbefore is the minimum value of the speed of rotation of the rotatable member necessary to produce sufficient centrifugal force to retain lubricant in the annular reservoir. At all normal running speeds of the gas turbine engine 10, it is arranged that the speed of rotation of the shaft 30 exceeds this predetermined value.

It will also be appreciated that it is not necessary to supply lubricant continuously to the reservoir 54: thus it would be possible to lubricate the bearing 38 by means other than the duct 56, so dispensing with the duct 56, and to arrange that lubricant is supplied to the reservoir 54 during rotation thereof only when the reservoir is not full.

Finally, the lubrication system of the present invention is not solely applicable to the lubrication of splines, but could readily be adapted for lubricating control linkages and other parts which require intermittent lubrication in apparatus or machinery having suitable rotating parts.

I claim:

1. A lubricated drive system for an accessory of a gas turbine engine comprising: a hollow drive shaft extending from the engine and having splines on one end thereof; bearing means rotatably supporting said drive shaft; a second shaft extending from the accessory and having splines on one end thereof drivingly interconnected with the splines of said hollow drive shaft; an annular reservoir provided internally of said hollow drive shaft and arranged to be continuously supplied with lubricant; outlet means providing communication between said bearing means and said reservoir, said outlet means being positioned with respect to said reservoir so that when speed of rotation of said drive shaft is equal or greater than a predetermined value, a predetermined quantity of lubricant is retained in said reservoir by centrifugal force and excess lubricant in said reservoir flows through said outlet means and lubricates said bearing means; and means providing communication between said reservoir and the drivingly interconnected splines of said drive shaft and said second shaft and arranged to permit the predetermined quantity of lubricant in said reservoir to spill therefrom to said drivingly interconnected splines when speed of rotation of said drive shaft falls below said predetermined value.

2. A lubricated drive system as claimed in claim 1 wherein said hollow drive shaft is provided with a circumferentially extending recess in its internal surface which defines said reservoir, said recess being positioned between axially separated portions having different radii, and in which said outlet means comprises at least one substantially radially extending duct extending between the one portion of the internal surface of said drive shaft having the larger radius and the external surface of the drive shaft.

3. A lubricated drive system as claimed in claim 2 in which said outlet means further includes an annular chamber provided on the external surface of said drive shaft and at least one further duct communicating with the chamber on the external surface of said drive shaft and extending radially outwardly, said one further duct communicating with the annular chamber on the external surface of said drive shaft at a position substantially diametrically opposed to a position in which said first-mentioned duct communicates whereby lubricant is substantially prevented from flowing to said bearing means when speed of rotation of said drive shaft falls below said predetermined value.

4. A lubricated drive system as claimed in claim 2 wherein said means providing communication between said reservoir and the drivingly interconnected splines includes an annular weir member provided on the portion of the internal surface of said drive shaft having the larger radius, said annular weir member being positioned on the side of said first-mentioned duct remote from said reservoir and between the said first-mentioned duct and said drivingly interconnected splines, said annular weir member having an intersurface of a greater radius than the portion of the internal surface of said drive member having the smaller radius to thereby permit lubricant to spill from the reservoir to the drivingly interconnected splines.

5. A lubricated drive system as claimed in claim 1 in which said hollow drive shaft is open and in which the splines on one end thereof are on the internal surface of said drive shaft, and wherein said second shaft has its splines provided on its external surface and which projects into the open end of said drive shaft.

6. A lubricated drive system as claimed in claim 5 including an annular sealing member between the internal surface of the open end of said drive shaft and the external surface of said second shaft on a side of the splines remote from said reservoir.